O. OHLSSON.
VALVE SET FOR COMBINED INTERNAL COMBUSTION ENGINES AND VACUUM PRESSURE PUMPS.
APPLICATION FILED JULY 18, 1916.

1,334,963. Patented Mar. 30, 1920.
2 SHEETS—SHEET 1.

Inventor:
Olof Ohlsson
by his attorneys

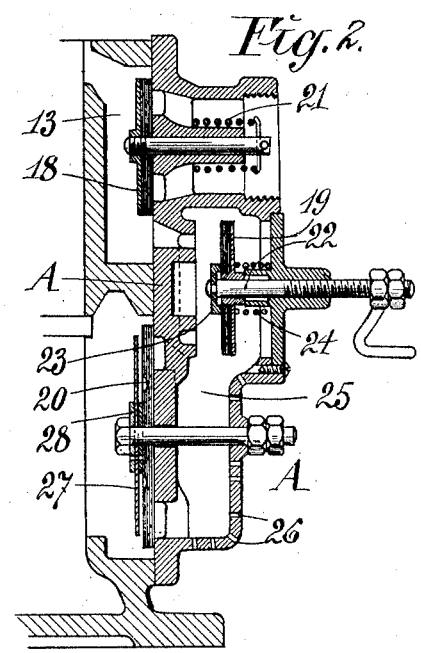

UNITED STATES PATENT OFFICE.

OLOF OHLSSON, OF SÖDERTELJE, SWEDEN.

VALVE SET FOR COMBINED INTERNAL-COMBUSTION ENGINES AND VACUUM PRESSURE-PUMPS.

1,334,963. Specification of Letters Patent. Patented Mar. 30, 1920.

Application filed July 18, 1916. Serial No. 109,977.

*To all whom it may concern:*

Be it known that I, OLOF OHLSSON, a subject of the King of Sweden, and resident of Skogsgatan 5, Södertelje, in the Kingdom of Sweden, have invented certain new and useful Improvements in Valve Sets for Combined Internal-Combustion Engines and Vacuum Pressure-Pumps, of which the following is a specification, reference being had therein to the accompanying drawings.

In milking machines of that class, which operate with vacuum, the vacuum hitherto has been effected by means of a special vacuum pump, which maintains a certain pressure in the vacuum chamber of the said machine. When the said pump is driven by an internal combustion engine a belt gearing or any other suitable gearing is provided between the said engine and the shaft of the pump. Consequently the power actuating the piston of the engine has to be transmitted to the piston of the pump through the movable parts of the engine, the said gearing and finally the movable parts of the pump. In all motion transmitting devices of the said type a great amount of power, evidently, is absorbed and especially in the present case the loss of power is disproportionally great owing to the fact, that the power which really is necessary for maintaining the vacuum in the vacuum chamber is very slight (only a few tenths of a horse power for the whole plant) compared with the power, necessary for overcoming the friction of the parts of the motion transmitting device. For the said reason a disproportionally great amount of fuel is used for the driving of the proper motion transmitting device located between the said pistons, which amount of fuel is a pure loss. The vacuum necessary for the actuating of the milking machine may, however, be effected without the said loss of power. This is effected by the power actuating the piston of the engine being transmitted directly to the piston of the pump, consequently without the aid of any movable parts. The piston of the engine and the piston of the pump are combined or coupled together to a single piston, viz. a differential piston, the vacuum or pressure chamber of the milking machine being put into communication through a conduit and a valve with the chamber in the engine located on the same side of the larger part of the piston as the working cylinder. Consequently, the vacuum period takes place during the combustion period (the working stroke) and the return stroke of the pump piston takes place simultaneously with the return stroke of the working piston of the engine. Owing to the said arrangement the pressure on the piston during the working stroke is so balanced by the effected useful work, that the movable parts of the engine, practically, are not subjected to any strain owing to the running light of the same, which results in a very long durability of the engine. Owing to the said arrangement of the engine the extra, expensive vacuum pump is superfluous, so that the space, necessary for the pump, may be used for other purposes and one is spared from the attention required by an air pump and the repairing of the same.

This invention relates to a valve set adapted to internal combustion engines, which set is so constructed, that the engine either may be used for generating vacuum directly in the vacuum chamber of the milking machine or may operate as an ordinary engine, when necessary by opening one of the valves of the said set. The valve set is so arranged, that it may be mounted on already existing internal combustion engines.

In the accompanying drawings,

Fig. 2 shows the valve set also in a vertical section but so adjusted, that the engine operates like an ordinary engine.

Figure 1:
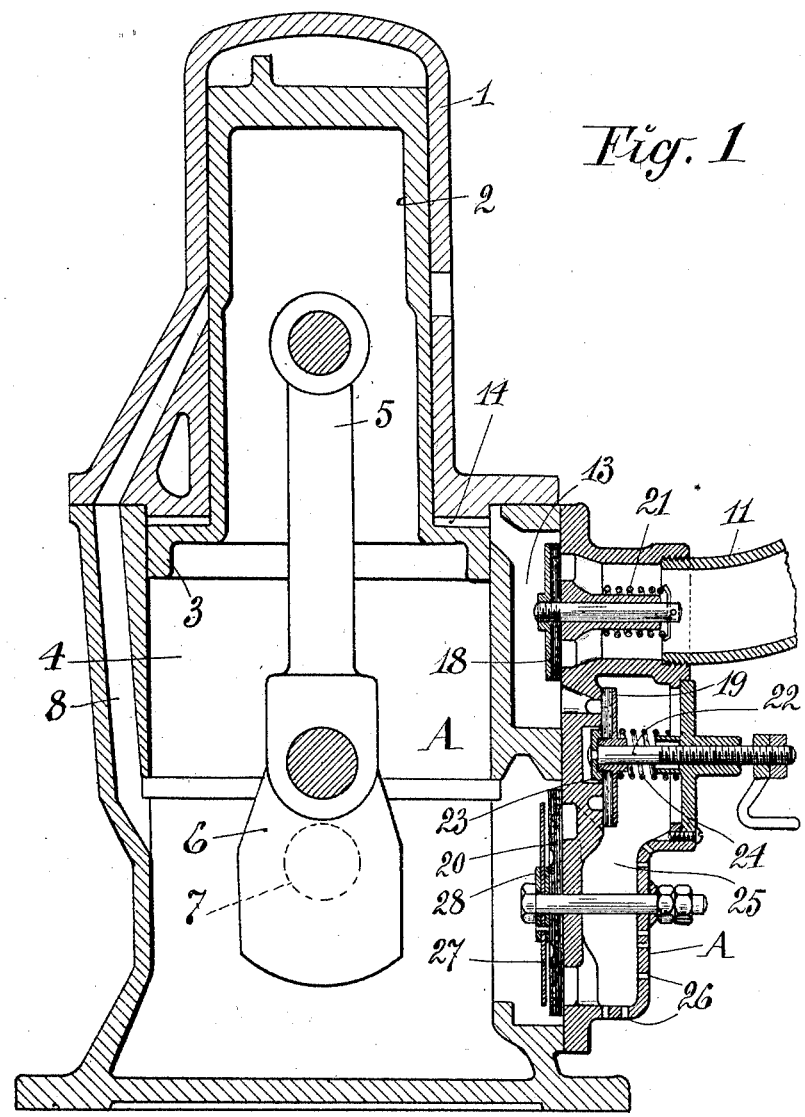
Figure 1 shows in vertical section an internal combustion engine provided with a valve set arranged in accordance with this invention; the said set being also shown in a vertical section and adjusted for the generating of a vacuum.

1 is the working cylinder of the engine and 2 the piston of the same. The said piston is arranged as a differential piston, the wider part 3 of which operates in the top part of the crank case 4, arranged like a cylinder. 5 is the pitman connected with the piston 2 and the crank 6, provided on the shaft 7 of the engine. From the crank case 4 the ordinary channel 8 extends, through which air is forced from the crank case 4 into the working cylinder 1 for the expelling of the combustion gases and the introducing of air into the said cylinder to be mingled with the fuel. The valve set mentioned above and shown in Figs. 1 and 2, comprises three valves 18, 19 and 20. The valve 18, held in closed position by a spring 21 or the like, connects the tube 11 or the like, communicating with the vacuum chamber of a milking machine or the like with the chamber 13 in the frame of the engine, which chamber through a channel communicates continuously with that chamber 14 of the crank case 4 which is located at the same side of the larger part 3 of the piston as the working cylinder 1 during the outward stroke of the working piston 2, 3. The valve 18 opens inward toward the chamber 13.

The hub of the valve 19 slides on a spindle 22, which is in screw-threaded engagement with a cover fixed to the casing A of the valve set and may be rotated by means of a handle. To the inner end of the spindle 22 a disk 23 is fixed, which is guided by a recess provided in the casing A of the valve set. The spindle 22 may be screwed into the said casing so far, that the disk 23 releases the valve 19, so that it is forced against the seat of the valve by a spring 24, as shown in Fig. 1. The valve 19, when being opened, is moved from the chamber 13 toward a chamber 25 provided in the valve casing A. By screwing the spindle 22 outward the disk 23 is caused to move the valve 19 from its seat against the action of the spring 24 and keeps the same in its open position, as shown in Fig. 2.

The third valve 20 of the set, which, as shown, may consist of a flap valve, connects the chamber 25 with the crank casing 4. The valve 20 is moved inward toward the said casing when brought into its open position. In the wall of the casing A openings 26 are provided, through which atmospheric air can pass into the said casing.

The engine and the described valve set operate in the following manner. When the piston 2, 3 is in its upper position, shown in Fig. 1, the fuel is introduced into the cylinder 1 by means of any suitable device (not shown). The pressure, effected by the combustion of the fuel, forces the piston 2, 3 outward (downward), vacuum being thus effected in the chamber 14. If the spindle 22 is in its inner position, as shown in Fig. 1, the valve 19 is closed during the outward movement of the piston 2, 3, so that vacuum is created in the chambers 14, 13, the valve 18 is opened and air is sucked from the vacuum chamber of the milking machine. Consequently, the vacuum created in the engine is utilized directly in the milking machine. As the working stroke of the piston is completed and the piston returns, the valve 18 is closed and the valve 19 is opened by the air compressed in the chambers 14 and 13. The air sucked into the chambers 13, 14 passes through the valve 19, the chamber 25 and the valve 20 into the crank case 4, from which it passes through the channel 8 into the working cylinder 1 during the next outward stroke of the piston 2, 3. The necessary quantity of supplementary air is sucked into the crank case 4 through the openings 26 during the inward stroke of the piston. If the valve 19 is brought into the open position shown in Fig. 3 by the spindle 22 being screwed outward, air passes during the outward stroke of the piston 2, 3 through the openings 26 into the chambers 13, 14, so that the valve 18 remains in its closed position. Consequently, no vacuum is created in the chambers 13, 14 and the engine operates like an ordinary engine. The changing of the engine from a vacuum creating engine to an ordinary engine and vice versa may be effected during the operation of the engine by shifting the valve 19.

For the driving of the described vacuum-engine only such amount of pressure must be effected as is necessary to move the piston against the vacuum in the pumping cylinder and to impart to the flying-wheel (not shown), of the engine such a momentum that the said wheel is able to return the piston. Consequently, the said pressure may be similar to the pressure necessary to drive the engine during its running light. All useful work of the engine is effected by the piston directly in the vacuum chamber 14 during the working stroke of the same.

The valve set may easily be so arranged, that the air compressed in the chamber 14 during the return stroke of the piston 2, 3 passes into a receptacle or the like in order to be used as a driving medium. For the said purpose the valves 18, 19 are so arranged, that they are opened in a direction opposite to that shown in the drawings, so that the valve 18 operates like a pressure valve and the valve 19 like a suction valve.

While the valve 19 is in its open position shown in Fig. 2, air is sucked into the chambers 13, 14 during the working stroke of the piston, which air then, during the return stroke of the piston, passes through the valve 20 into the crank case. During the return stroke of the piston also air is sucked into the crank case directly through the openings 26. Consequently, the air quantity necessary for the filling of the crank case is sucked into the engine during two periods, which results in the sucking operation being effected more quietly. The flap valve 20 consists of a disk of india rubber or the like. To the spindle of the said valve a disk 27 is fixed between two small plates 28, 28, which disk 27 preferably is of a springy metal and forms a springy abutment for the disk 20, as the valve is opened, which results in the valve operating more silently.

The invention may, evidently be modified in many respects without exceeding the limits of the same.

What I claim is:

1. In a valve set for adapting internal combustion engines either for generating a vacuum for the actuating of a milking machine or the like, or for ordinary running, the combination of a casing adapted to be fixed to the engine, a valve provided in said casing and adapted to connect the milking machine with a chamber in the working cylinder of the engine in which vacuum is created by the piston during the operation of the engine, an air valve provided in the said casing and adapted to discharge air from the said chamber, and means for holding the valve last mentioned in open position when the engine has to operate as an ordinary engine.

2. In a valve set for adapting internal combustion engines either for generating a vacuum for the actuating of a milking machine or the like, or for ordinary running, the combination of a casing adapted to be fixed to the engine, a valve provided in the said casing and adapted to connect the milking machine with a chamber in the working cylinder of the engine in which vacuum is created by the piston during the operation of the engine, a chamber in the said casing, a valve adapted to discharge air from the said chamber of the engine into the said chamber of the casing, means for holding the valve last mentioned in open position, the wall of the said chamber of the casing being provided with an opening, and a valve adapted to connect the chamber of the casing with the crank case of the engine.

In witness whereof I have hereunto signed my name.

OLOF OHLSSON.